US005982603A

United States Patent [19]
Choi

[11] Patent Number: 5,982,603

[45] Date of Patent: Nov. 9, 1999

[54] SURGE PROTECTOR ASSEMBLY

[75] Inventor: KyungHwa Choi, Seoul, Rep. of Korea

[73] Assignee: Dongil Technology Ltd., Kyonggi-do, Rep. of Korea

[21] Appl. No.: 08/906,551

[22] Filed: Aug. 5, 1997

[30] Foreign Application Priority Data

Aug. 14, 1996 [KR] Rep. of Korea ...................... 96-24456

[51] Int. Cl.[6] ...................................................... H02H 1/00

[52] U.S. Cl. ............................................................. 361/119

[58] Field of Search .................................... 361/117, 119, 361/126, 127, 679

[56] References Cited

U.S. PATENT DOCUMENTS 5,034,846 7/1991 Hodge et al. ........................... 361/119

5,408,379 4/1995 Oguchi et al. .......................... 361/119

5,502,612 3/1996 Osterhout et al. ...................... 361/117

*Primary Examiner*—Ronald W. Leja

*Attorney, Agent, or Firm*—Darby & Darby

[57] ABSTRACT

A surge protector assembly which is easily, quickly and detachably installed in a main board of an electronic appliance for protection from instantaneous overvoltage is disclosed, the assembly has a surge relieving unit which absorbs instantaneous overvoltage in the event of a surge of voltage, a fuse connected to the surge relieving unit in series which cuts off power to the electronic elements in the event of an instantaneous overvoltage, a temperature indicator which varies in color in accordance with temperature of the assembly in order to allow a user to easily check whether the assembly is overheated or adversely affected by instantaneous overvoltage, and a plurality of lead terminals used for detachably attaching the assembly to the main board which enables a timely change of a damaged assembly with a new one.

6 Claims, 7 Drawing Sheets

SURGE PROTECTOR ASSEMBLY

BACKGROUND OF THE INVENTION

1. Field of the Invention

The present invention relates, in general, to a surge protector assembly used for protecting electronic appliances in the event of a surge of voltage and, more particularly, to a surge protector assembly suitable for being easily and quickly mounted or replaced with a new one and effectively protecting electronic appliances from instantaneous overvoltage caused by, for example, the striking of a lightning bolt.

2. Description of the Prior Art

In typical electronic appliances such as industrial or home appliances, various electronic elements such as choke coils, resistors, condensers and surge protectors are mounted on a printed circuit board (PCB) through a lead wire inserting and soldering process. That is, the electronic elements are preliminarily arranged on a PCB by inserting the lead wires of each element into the wire inserting holes of the PCB prior to soldering the lead wires onto the PCB. In this case, the mounting and soldering of the electronic elements onto the PCB may be achieved manually by a worker or automatically by robotic machinery. Of course, it should be understood that each of the electronic elements may be received in a case, which is screwed to the PCB or engages with a rail provided on the PCB.

FIG. 11 is a sectional view showing a PCB with a varistor used as a surge protector. As shown in the drawing, the PCB 1 is printed with a wiring pattern (not shown) on the top side and has a plurality of lead wire insert holes. The lead wire 2*a* of the varistor 2 is inserted into a hole of the PCB 1 from the top side to the bottom side prior to soldering the lead wire 2*a* onto the bottom side of the PCB 1. In the drawing, the reference numeral 3 denotes a solder part formed on the bottom side of the PCB 1. Typically, various electronic elements are mounted onto the top side of the PCB 1 through a soldering process. In the operation of the PCB, one or more electronic elements on the PCB 1 may be adversely affected by overvoltage, overheating or electric shock and often requires replacement of the PCB 1 or replacement of the affected element with a new one. However, in order to replace an affected element with a new one, the affected element has to be removed from the PCB with the solder parts 3 being thermally melted, thus requiring skilled and careful workmanship while replacing the affected element with a new one. Such a replacement of the electronic element is time consuming. In addition, the wiring pattern of the PCB 1 may be thermally affected while the solder parts 3 are heated and melted. In the above PCB 1 with the typical surge protector, it is also difficult to detect breakage or deterioration of the surge protector. Another problem of the above surge protector resides in that a thermally affected electronic element fails to be easily discriminated from other normal elements.

In order to test the surge resisting performance of an electronic appliance with a varistor acting as a surge protector, it is necessary to remove the varistor from the appliance prior to testing and mount the varistor in the appliance through a soldering process after the testing, thus being time consuming.

SUMMARY OF THE INVENTION

Accordingly, the present invention has been made keeping in mind the above problems occurring in the prior art, and an object of the present invention is to provide a detachable surge protector assembly for electronic appliances, which allows a surge affected electronic element to be easily and quickly replaced with a new one and is easily removed from and mounted in an electronic appliance during a test of voltage resisting performance of the electronic appliance.

Another object of the present invention is to provide a surge protector assembly, which allows a thermally affected electronic element to be easily discriminated from other normal elements.

In order to accomplish the above objects, the present invention provides a surge protector assembly, comprising: a surge relieving unit adapted for absorbing instantaneous overvoltage applied to electronic elements in the event of a surge of voltage; a power cutoff unit connected to the surge relieving unit and adapted for cutting off power for the electronic elements in the event of an instantaneous overvoltage; a housing having a bottom cover and receiving both the surge relieving unit and the power cutoff unit; and a plurality of lead terminals connected to both the surge relieving unit and the power cutoff unit and set in the housing, with the lower end of each terminal projecting downward into the exterior of the bottom cover, the terminals being detachably attached to a main board thus detachably mounting the surge protector assembly onto the main board.

In other embodiments of this invention, the surge protector assembly are formed into two types: an adapter-type assembly detachably mounted to the exterior wall of an electronic appliance and a socket-type assembly having a connector.

BRIEF DESCRIPTION OF THE DRAWINGS

The above and other objects, features and other advantages of the present invention will be more clearly understood from the following detailed description taken in conjunction with the accompanying drawings, in which.

DESCRIPTION OF THE PREFERRED EMBODIMENTS

Figure 1:
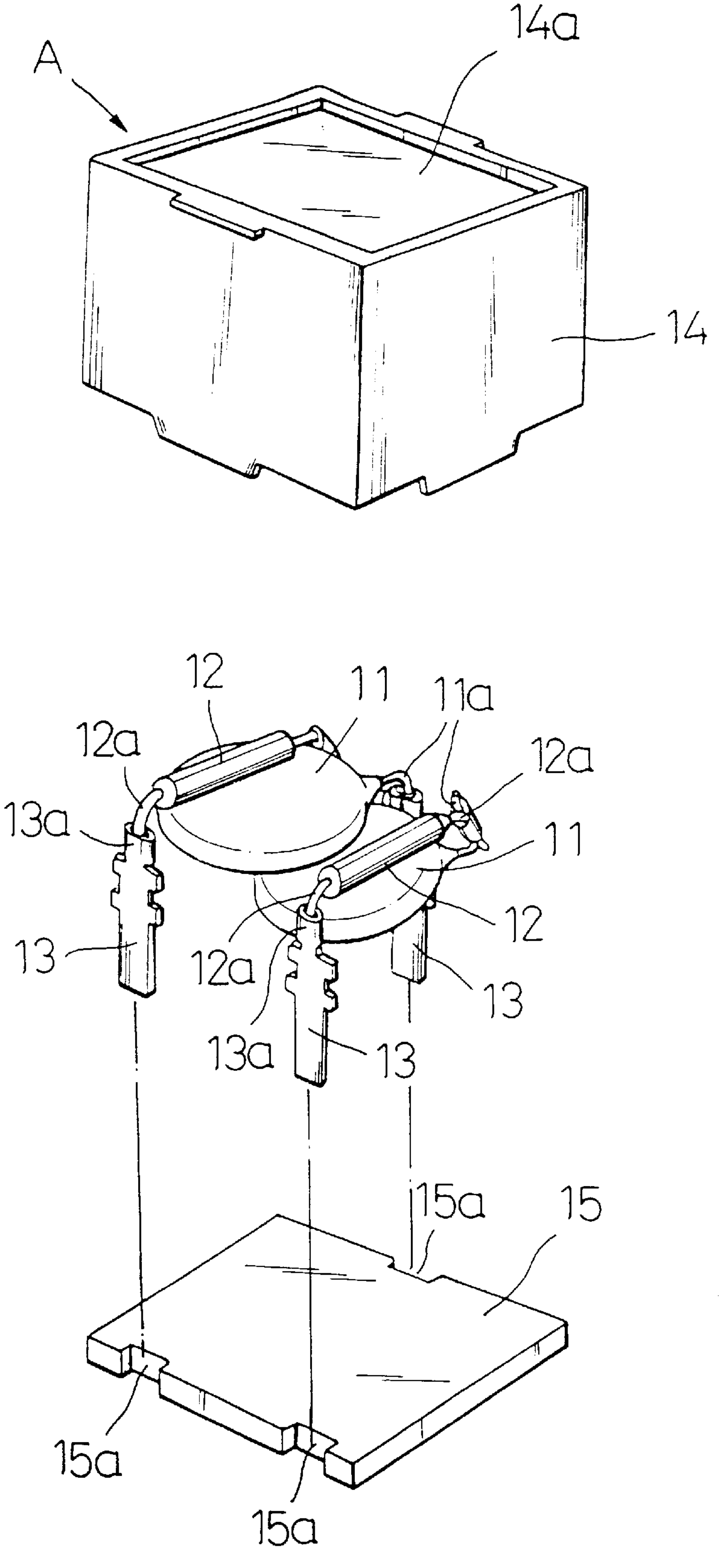
FIG. 1 is an exploded perspective view of a surge protector assembly, detachably mounted to a main board, in accordance with the primary embodiment of the present invention.

In the embodiments of this invention, the same elements are designated by the same reference numerals and explanation is thus not deemed repeated.

Figure 2:
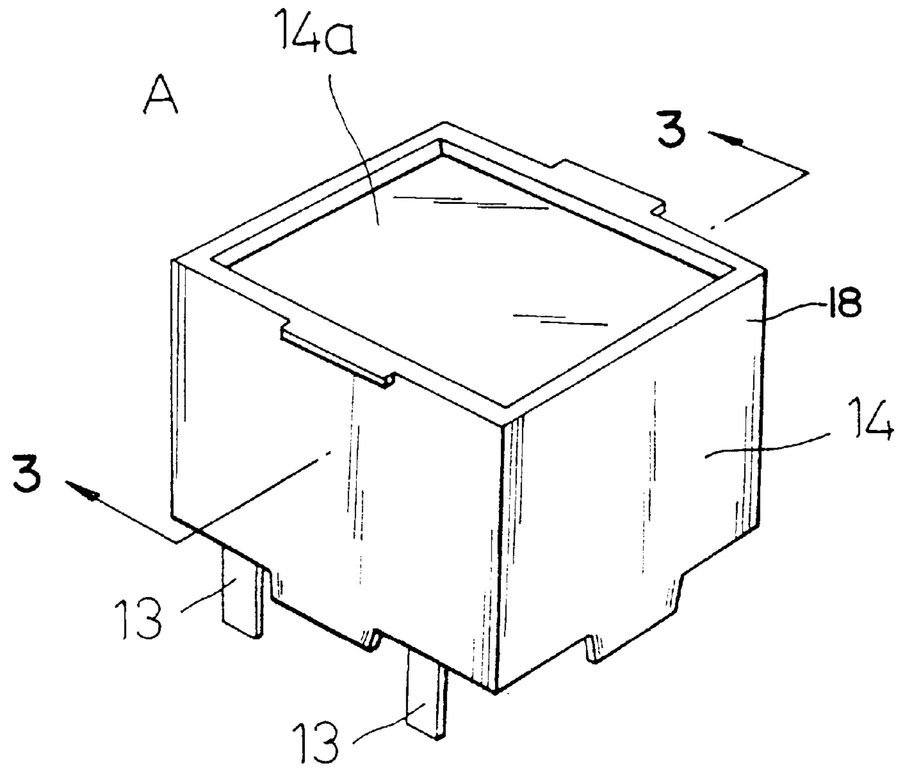
FIG. 2 is a perspective view of the surge protector assembly of FIG. 1, after the parts are assembled into a single body.
Figure 3:
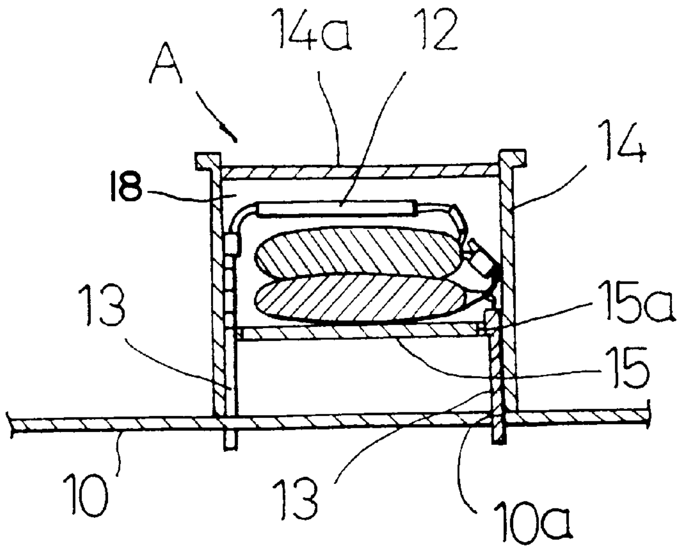
FIG. 3 is a sectional view of the surge protector assembly taken along the section line I—I of FIG. 2.

FIGS. 1 to 3 show a surge protector assembly, detachably mounted to a main board, in accordance with the primary embodiment of the present invention. In the primary embodiment, the surge protector assembly A, which protects a plurality of electronic elements mounted on a main board 10 from instantaneous overvoltage caused by a surge of voltage, comprises a surge relieving unit 11 and a power cutoff unit 12. The surge relieving unit 11 absorbs instantaneous overvoltage applied to the main board 10 in the event of a surge of voltage, while the power cutoff unit 12 cuts off power for the electronic elements. The surge protector assembly also includes a plurality of lead terminals 13, which are connected to the lead wires of both the surge relieving unit 11 and the power cutoff unit 12. The detachable surge protector assembly A is mounted to the main board 10 by detachably inserting the lead terminals 13 into terminal insert holes 10*a* of the main board 10.

In the present invention, a known surge protector is used as the surge relieving unit 11, while a temperature fuse, which is burnt out at a predetermined temperature, is used as the power cutoff unit 12.

FIG. 1 is an exploded perspective view of the surge protector assembly according to the primary embodiment. As shown in the drawing, the surge relieving unit 11 is connected to the power cutoff unit 12 in series, with the lead terminals 13 being connected to the lead wires 11*a* and 12*a* of both the surge relieving unit 11 and the power cutoff unit 12.

In order to protect the thermally affectable power cutoff unit 12, the lead terminals 13 are connected to the lead wires 11*a* and 12*a* through a non-heating process such as a clamping process in place of a heating process such as a soldering or welding process. In the preferred embodiment, the connection end of each lead terminal 13 is rolled thus forming a connection ring 13*a* at which the terminal 13 is connected to an associated lead wire 11*a*, 12*a* through such a non-heating process. Both the surge relieving unit 11 and the power cutoff unit 12, which are connected together in series, are arranged at a position between a box-shaped housing 14 and a bottom cover 15, with the lower end of each terminal 13 projecting downward into the exterior of the bottom cover 15. In the preferred embodiment, the housing 14 opens at the bottom thus receiving both the surge relieving unit 11 and the power cutoff unit 12 therein and closed by a transparent window 14*a* at the top thus allowing a user to look at the units 11, 12 outside the housing 14. However, it should be understood that the housing 14 may be cast into a transparent body. In addition, the surge protector assembly also includes a temperature indicating means, which varies in color in accordance with temperature and allows a user to easily check whether the surge protector assembly A is overheated and adversely affected by instantaneous overvoltage caused by a surge of voltage. The temperature indicating means may comprise a temperature sensitive tape, which is attached to the external surface of the housing 14. Alternatively, the housing 14 may be painted with a temperature sensitive paint in place of the tape. At least one guide slot 15*a* may be formed on each of the opposite edges of the bottom cover 15 thus allowing the lead terminals 13 to pass through. The cover 15 is assembled with the housing 14 into a single body with the lead terminals 13 passing through the guide slots 15*a* of the cover 15 so that the terminals 13 are easily set in the surge protector assembly A.

When instantaneous overvoltage is applied to the main board 10 due to a surge of voltage, the voltage in the surge relieving unit 11 increases and causes the unit 11 to be overheated to a temperature of higher than a reference point and is thus damaged. When the surge relieving unit 11 is overheated as described above, the power cutoff unit 12 is burnt out, thus protecting both the electronic elements of the main board 10 and the electronic appliance from a fire caused by the damaged and overheated surge protector assembly A. At a temperature of higher than the reference point, the temperature indicating means of the surge protector assembly varies in color, thus allowing a user to easily check whether the assembly is overheated and damaged and to timely change the damaged assembly with a new one.

When both the surge relieving unit 11 and the power cutoff unit 12 of the assembly A are adversely affected and damaged by instantaneous overvoltage, the two units 11 and 12 have to be changed with new units. In order to change the damaged units 11 and 12 with new units, the damaged assembly may be removed from the main board 10 prior to mounting a new assembly with normal units 11 and 12 onto the main board 10. Alternatively, the damaged assembly may be removed from the main board 10 prior to removing the two damaged units 11 and 12 and the terminals 13 from the housing 14. Thereafter, new units 11 and 12 and new terminals 13 are assembled with the empty housing 14 thus forming a normal assembly prior to mounting the assembly onto the main board 10.

The housing 14 of the assembly is closed by the transparent window 14*a* at the top thus allowing a user to look at the surge relieving unit 11 outside the housing 14.

In addition, a temperature sensitive tape 18 is attached to the interior wall of the housing 14 thus allowing a user to easily sense the temperature of the surge relieving unit 11.

Figure 4:
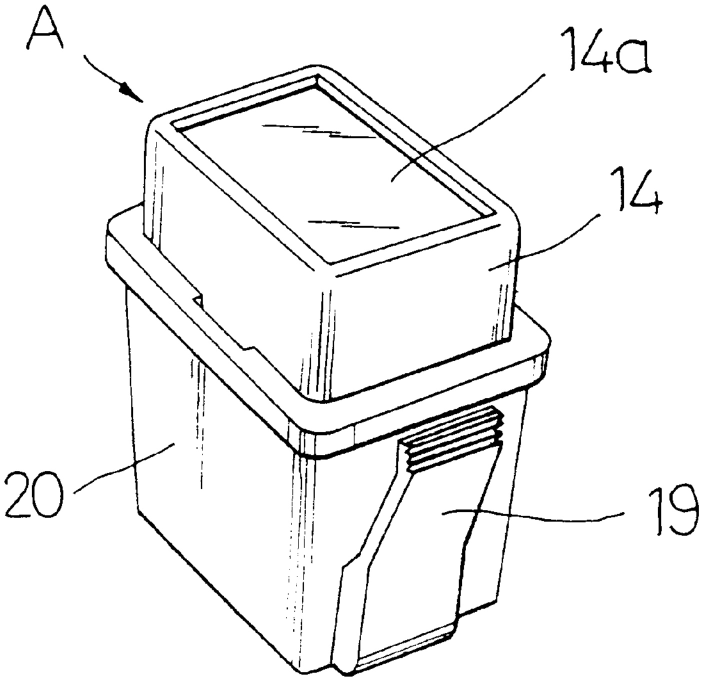
FIG. 4 is a perspective view of a surge protector assembly with a holder in accordance with the second embodiment of the present invention.
Figure 5:
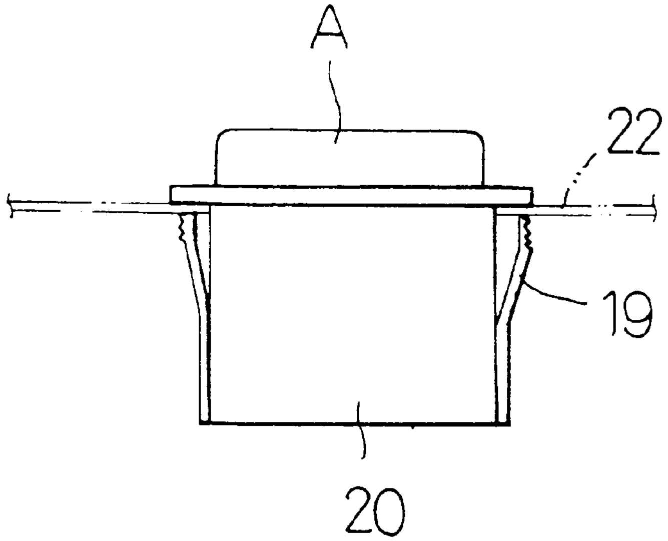
FIG. 5 is a view showing the surge protector assembly of FIG. 4, detachably mounted to the panel of an electric appliance by means of elastic clamp arms of the holder.

FIGS. 4 and 5 show a surge protector assembly in accordance with the second embodiment of the present invention. In the second embodiment, the surge protector assembly is formed into an adapter structure, which is not mounted to the main board 10 differently from the primary embodiment but is detachably mounted to the panel 22 of an electronic appliance. In the surge protector assembly A according to the second embodiment, both units 11 and 12 are encased by a housing 14 free from any lead terminal 13. The housing 14 is assembled with a box shaped holder or socket 20 into a single body. The holder or socket 20 has both a stop flange at the top and two elastic clamp arms 19 at opposite outside walls, thus detachably holding the assembly A on the panel 22. That is, when the assembly A with the holder or socket 20 is fitted into a mounting slot of the panel 22 from the outside, the elastic clamp arms 19 of the holder or socket 20 are pressed and in turn are elastically restored to their original positions, thus detachably clamping the assembly A to the panel 22.

Figure 6:
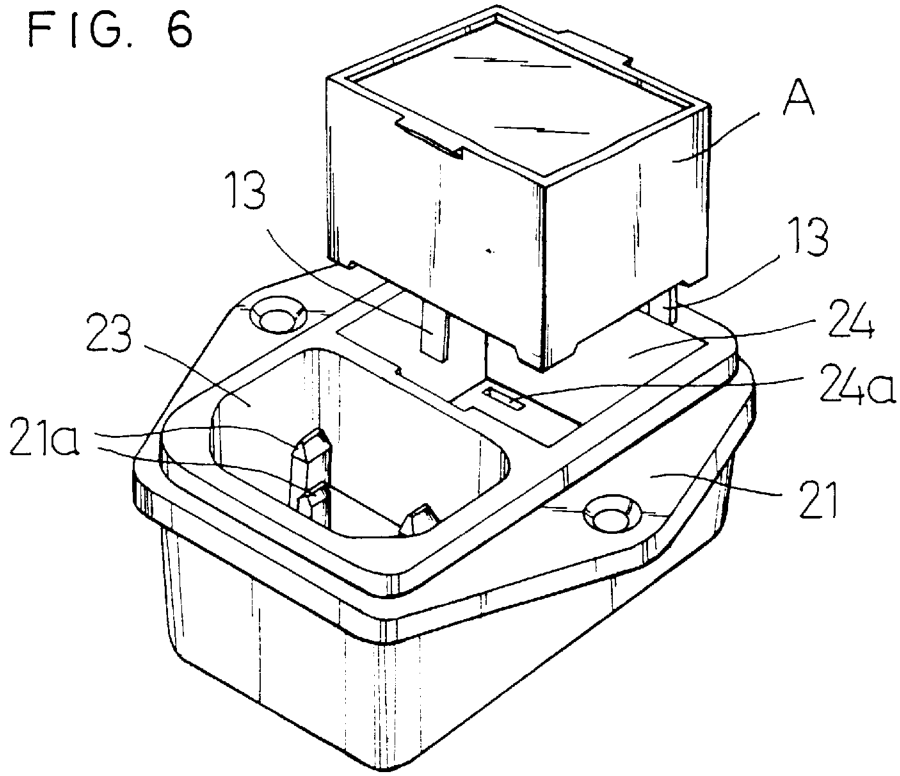
FIG. 6 is an exploded perspective view of an AC power socket with the surge protector assembly of the present invention.

FIG. 6 is an exploded perspective view of an AC power socket or socket with the surge protector assembly A of this invention. As shown in the drawing, the assembly A with both the surge relieving unit 11 and the power cutoff unit 12 may be installed in an AC power socket or socket 21 with a connector. The AC power socket or socket 21 has two openings: a socket opening 23 and an assembly insert opening 24 which are formed abreast on the top of the socket 21. In the AC power socket or socket 21, a plurality of lead terminals 21*a* are provided in the socket opening 23, while the surge protector assembly A is received in the other opening 24. In this case, a plurality of contact holes 24*a* are formed on the bottom of the insert opening 24 and so the lead terminals 13 of the surge protector assembly A are inserted into the contact holes 24*a*.

Each of the assemblies A, which are mounted to the panel 22 of an electronic appliance as shown in FIGS. 4 and 5 or installed in a power socket as shown in FIG. 6, effectively protects electronic elements from instantaneous overvoltage caused by a surge of voltage.

Figure 7:
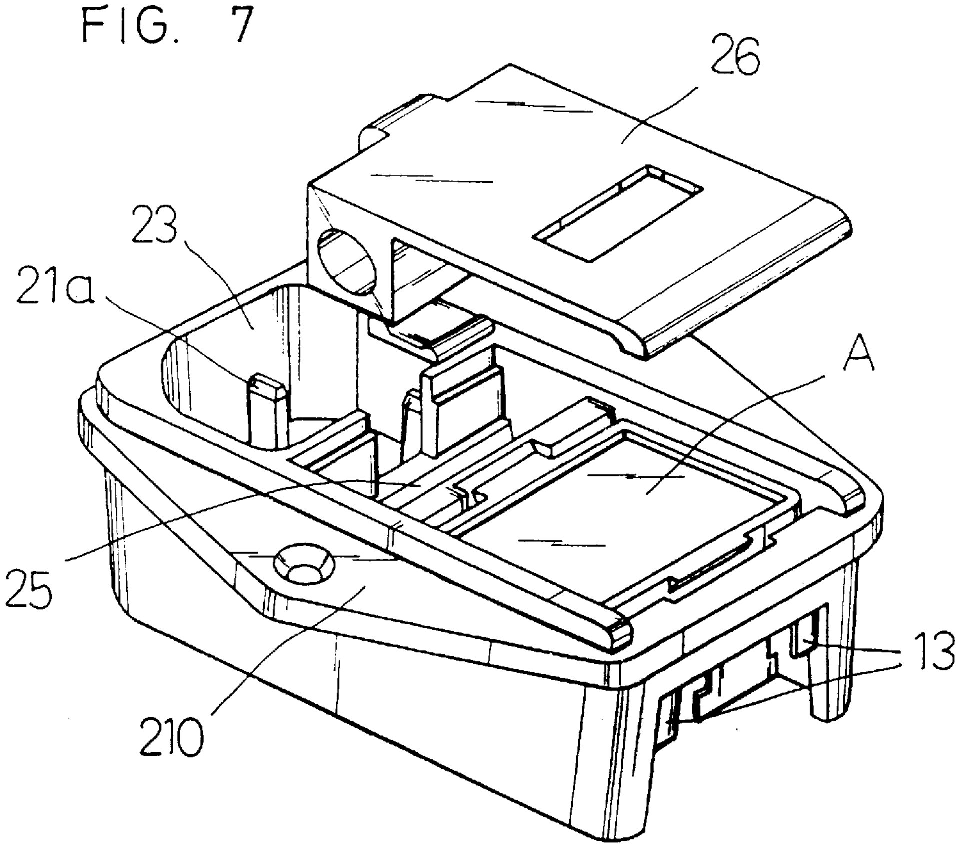
FIG. 7 is an exploded perspective view of a lidded AC power socket with both a fuse holder and the surge protector assembly of this invention.
Figure 8:
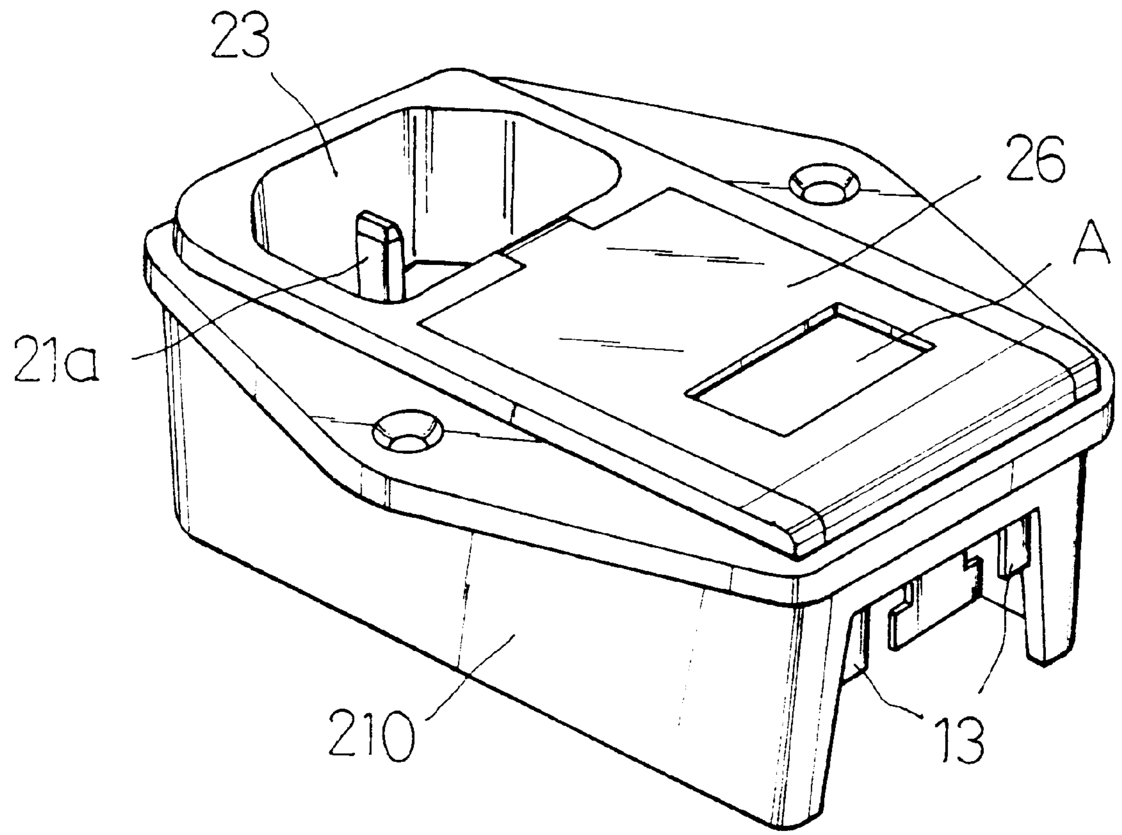
FIG. 8 is a perspective view of the lidded power socket of FIG. 7, with a top lid covering the surge protector assembly.

FIGS. 7 and 8 show a lidded AC power socket 210 with both a fuse holder 25 and the surge protector assembly A of this invention. In the drawings, the reference numeral 26 denotes a top lid, which covers the surge protector assembly A installed in the assembly insert opening of the socket 210.

Figure 9:
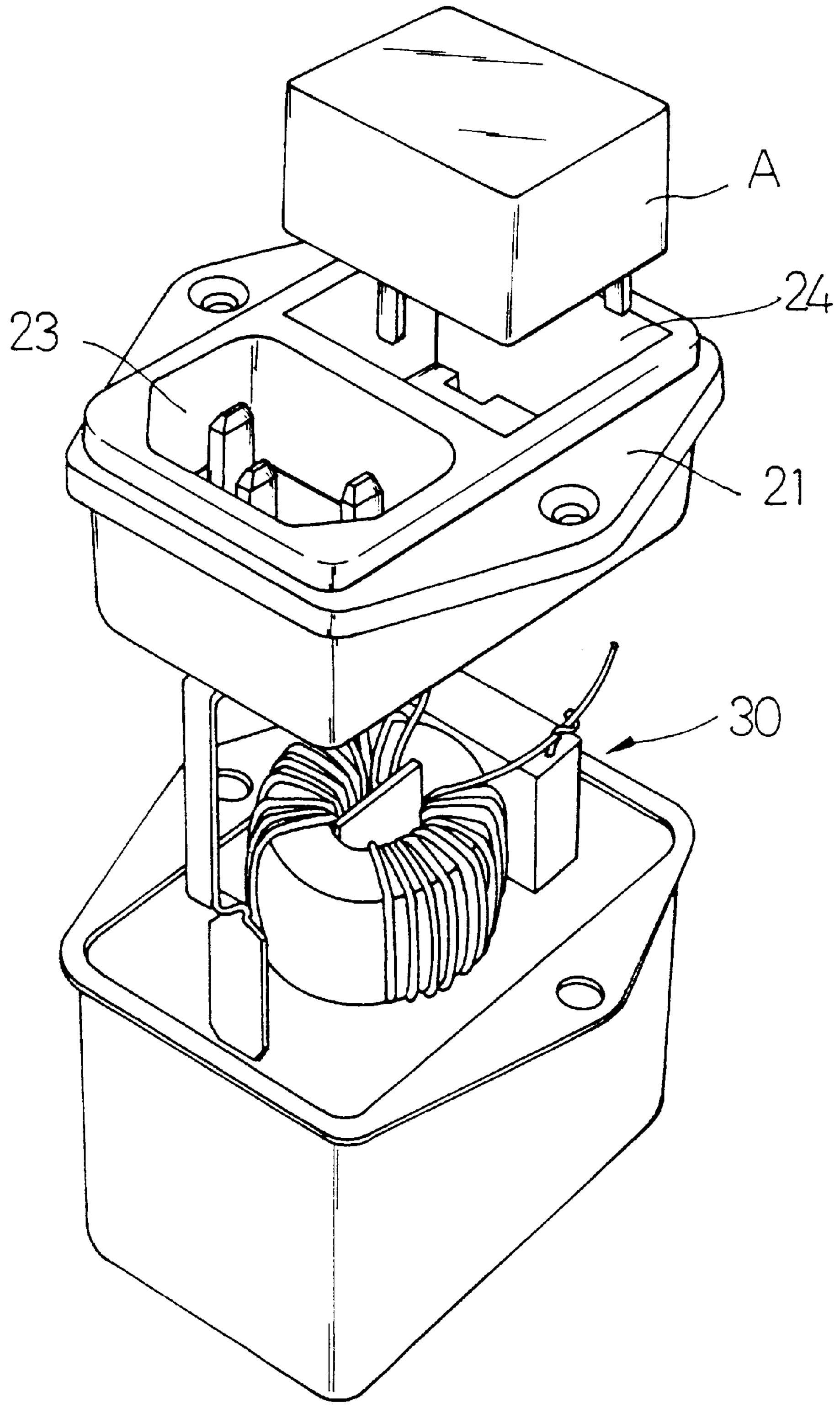
FIG. 9 is a sectional view of the surge protector assembly of this invention, with a noise filter being assembled with the surge protector assembly.

FIG. 9 is a sectional view of the surge protector assembly A of this invention, with a noise filter 30 being assembled with the surge protector assembly A.

The surge protector assembly A according to any one of the embodiments of FIGS. 4 to 9 includes a temperature indicating means, which varies in color in accordance with temperature and allows a user to easily check whether the surge protector assembly A is overheated and adversely affected by instantaneous overvoltage caused by a surge of voltage. In the same manner as described for the primary embodiment, the temperature indicating means may be selected from a temperature sensitive tape or paint. Due to the temperature indicating means, it is possible to timely change a damaged assembly with a new one.

Figure 10:
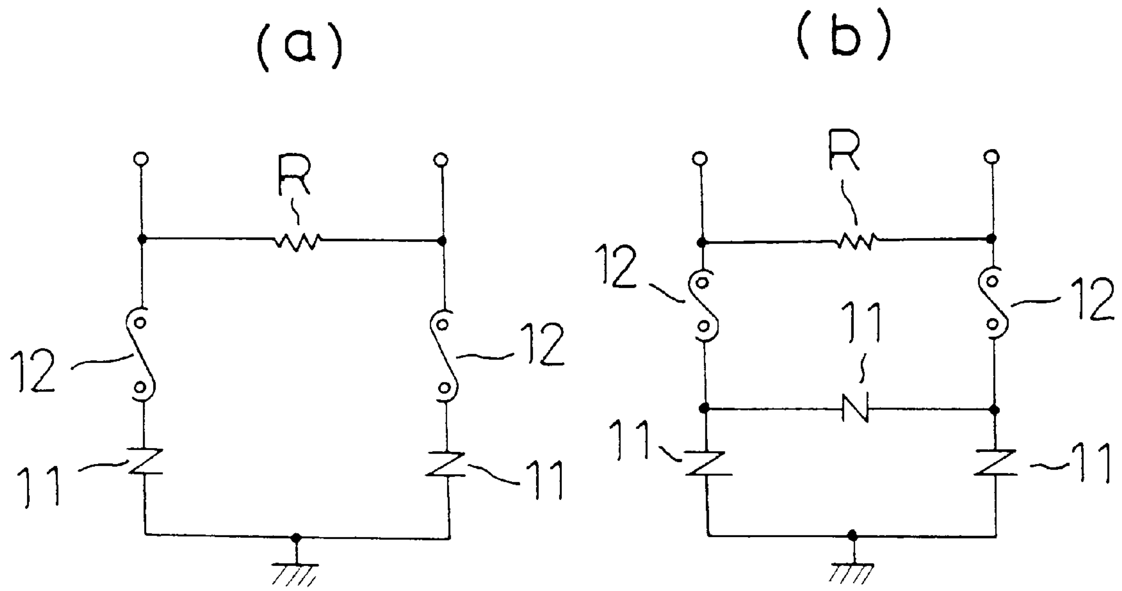
FIGS. 10*a* and 10*b* are circuit diagrams of surge protector assemblies according to different embodiments of this invention.
Figure 11:
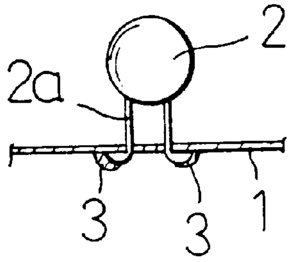
FIG. 11 PRIOR ART
FIG. 11 is a sectional view showing a PCB with a varistor used as a typical surge protector.

FIG. 10*a* is a circuit diagram of a surge protector assembly according to an embodiment of this invention. As shown in the drawing, the surge protector unit 11 may comprise two varistors 11, with a common terminal of the two varistors 11 being grounded and the other end of each varistor 11 opposite to the common terminal being connected to a fuse or power cutoff means 12 in series.

In the assembly of FIG. 10*a*, a resistor may be connected to the two fuses 12 at the ends opposite to the varistors 11.

FIG. 10*b* is a circuit diagram of a surge protector assembly according to another embodiment of this invention. In the embodiment of FIG. 10*b*, the general construction of the assembly remains the same as that described for the embodiment of FIG. 10*a*, but a third varistor 11' is connected to the two varistors 11 in parallel at a position between each varistor 11 and an associated fuse 12. In this embodiment, a resistor may be connected to the two fuses 12 at the ends opposite to the varistors 11.

As described above, the present invention provides a surge protector assembly for electronic appliances. The assembly of this invention can be easily, quickly and detachably installed in an electronic appliance without damaging a main board or other electronic elements. The assembly also includes a temperature indicating means, which varies in color in accordance with temperature and allows a user to easily check whether the assembly is overheated and adversely affected by instantaneous overvoltage caused by a surge of voltage. Due to the temperature indicating means, it is possible to timely change a damaged assembly with a new one. The assembly thus effectively protects an electronic appliance from instantaneous overvoltage and lengthens the expected life span of the electronic appliance.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A surge protector assembly, comprising:

a surge relieving unit adapted for absorbing instantaneous overvoltage applied to electronic elements in the event of a surge of voltage;

a fuse adapted for cutting off power to the surge relieving unit in the event of the instantaneous overvoltage and connected to the surge relieving unit in series, the surge relieving unit being further connected to a first terminal for receiving voltage in series and the combination of said fuse and said surge relieving unit being further connected to a second terminal for supplying voltage to the electronic elements in parallel;

a housing having a bottom cover and receiving both the surge relieving unit and the fuse; and a plurality of lead terminals each having a connection end connected to at least one of the surge relieving unit and the fuse and set in the housing, each of the plurality of lead terminals having a lower end projecting downward into the exterior of said bottom cover, the lead terminals being directly detachably attached to a main board thus detachably mounting the surge protector assembly onto the main board, wherein the connection end of each of the lead terminals is rolled to form a connection ring so that the lead terminals are connected to one of the surge relieving unit and the fuse using a non-heating process.

2. The surge protector assembly according to claim 1, wherein said bottom cover is recessed into the housing and has a guide slot on each of the opposite edges thus allowing said lead terminals to pass through.

3. The surge protector assembly according to claim 1, wherein both the surge relieving unit and the fuse are installed in a power socket with a connector or in an AC power socket with a connector.

4. The surge protector assembly according to claim 1, further comprising temperature indicating means allowing a user to sense an overheating of said surge relieving unit.

5. The surge protector assembly according to claim 4, wherein said temperature indicating means comprises a temperature sensitive tape or paint varying in color in accordance with temperature.

6. A surge protector assembly, comprising:

a surge relieving unit adapted for absorbing instantaneous overvoltage applied to electronic elements in the event of a surge of voltage;

a fuse adapted for cutting off power to the surge relieving unit in the event of the instantaneous overvoltage and connected to the surge relieving unit in series, the surge relieving unit being further connected to a first terminal for receiving voltage in series and the combination of said fuse and said surge relieving unit being further connected to a second terminal for supplying voltage to the electronic elements in parallel;

a housing having a bottom cover and receiving both the surge relieving unit and the fuse;

a plurality of first lead terminals each having a connection end connected to at least one of the surge relieving unit and the fuse and set in the housing, each of the plurality of lead terminals having a lower end projecting downward into the exterior of said bottom cover, the lead terminals being directly detachably attached to a main board thus detachably mounting the surge protector assembly onto the main board, wherein tile connection end of each of the lead terminals is rolled to form a connection ring so that the lead terminals are connected to one of the surge relieving unit and the fuse using a non-heating process; and a noise filter assembled with the surge relieving unit and the fuse.

* * * * *